Nov. 19, 1940.  F. H. EMERY  2,222,310
METHOD AND APPARATUS FOR SEWAGE DISPOSAL AND UTILIZATION
Filed Oct. 11, 1937
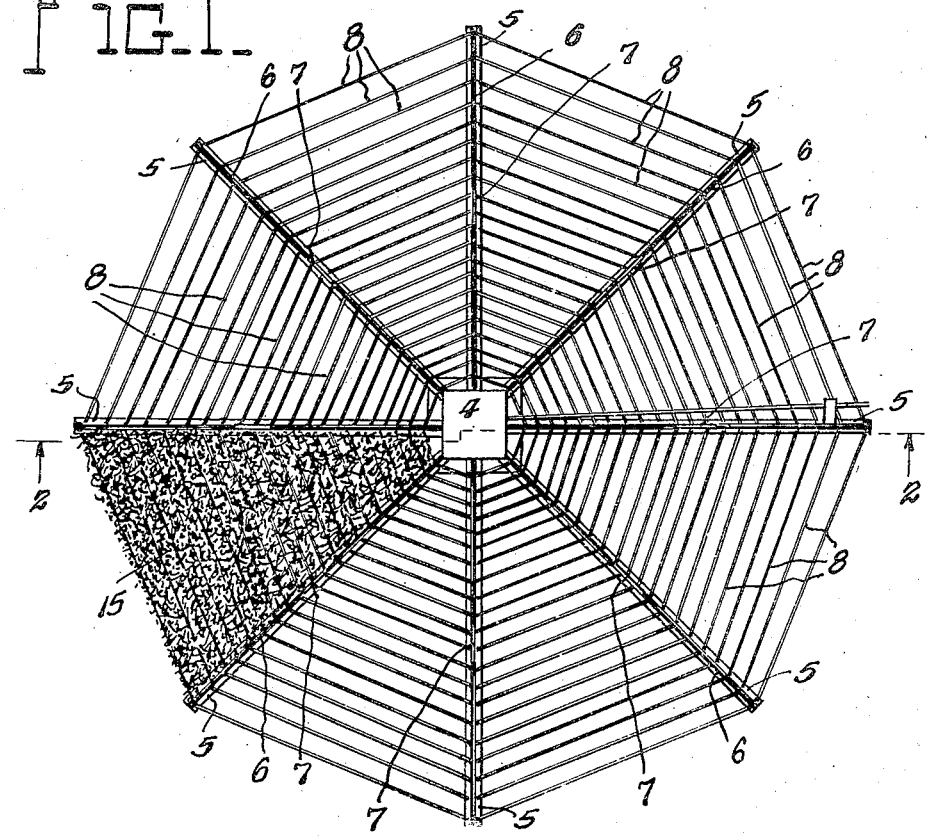
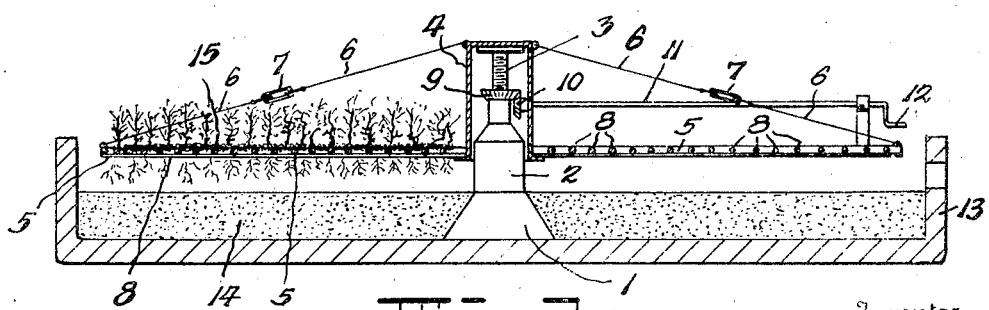
Inventor
FREDERIC H. EMERY.

Patented Nov. 19, 1940

2,222,310

UNITED STATES PATENT OFFICE 2,222,310

METHOD AND APPARATUS FOR SEWAGE DISPOSAL AND UTILIZATION

Frederic H. Emery, Bedford, Ohio

Application October 11, 1937, Serial No. 168,483

9 Claims. (Cl. 210—7)

The purpose of this invention is to provide a practical and more economical method of sewage disposal than heretofore developed. At the present time it is customary to treat the solids of sewage by bacterial action, as one of the common methods used. In this way an end product consisting of a slurry of humus-like material is obtained, and it is necessary that this material be de-watered, resulting in a common practice involving difficulty and relatively high expense. The sludge is permitted to dry on sand beds, or it may be chemically treated and filtered by the employment of mechanical filtering means.

The chemical treatment or processing is a costly method, and, where the filtering system is employed, the filter beds occupy large areas necessarily and require a very considerable money investment for their construction. The filtering process likewise consumes a relatively long period of time, as from ten days to three weeks.

My invention has been developed with a view to using installation that has heretofore been used under some conditions, though special installations would ordinarily be resorted to, and involves primarily the utilization of the sludge for the purpose of growing plants, crops, or the like. The plant growth is employed as a means of de-watering the sludge by natural processes, thus providing, so to speak, an advantageous productive operation because the sludge treatment area is availed of for dual purposes, in an obvious manner. Whatever plant life or agricultural crops are raised, with the employment of the sludge practically as an earth or ground base, obviously reduces the cost of the sewage disposal treatment.

In the carrying out of the invention, furthermore, apparatus is contemplated to be used involving a special type of grid construction adapted to be disposed above the surface level of the sludge and to carry some suitable material such as straw, excelsior, or the like, in which seeds or plants may be planted in a convenient and suitably supported manner to enable quick growth to start. The invention includes additionally special means for the raising of the grid structure with the plants, seedlings, or the like supported thereby in order that the distance between the stems of the plants and the level of the sludge, which is de-watered in supplying the plants with moisture, may be adjusted from time to time so that the upper root systems of the plants may receive the proper amount of air.

While my invention is herein described as a process useful in conjunction with the apparatus employed for treatment of Imhoff tank sludge, it is contemplated within the provision of the invention to use any organic sewage material such as raw sewage, for instance. The actual material availed of will depend upon local conditions. Where irrigation is practiced, in certain localities, the entire flow of material may be profitably used, whereas in other places it may be desirable to settle and in some cases to digest the sludge previous to its use for growing plants.

In the accompanying drawing one form of apparatus useful for purposes of the invention is illustrated, and—

Figure 1 is a top plan view of a tank or lagoon in which is arranged the adjustable grid unit designed for the purposes of my method of sewage disposed.

Figure 2 is a vertical sectional view of the said apparatus.

Referring to the drawing, the apparatus of the invention will first be set forth.

In its preferred form, as shown, said apparatus comprises a base 1 having a standard 2 projecting upwardly therefrom, in which standard is received the lifting screw 3, said structure forming virtually a jack. Carried by the upper end of the screw 3 is a casing member 4 which supports at its lower end the diverging arms 5, the inner ends of which may be suitably secured to the casing 4 and the outer ends of which are connected by truss rods 6 with the upper portion of said casing 4. Turnbuckles 7 intermediate the ends of each truss rod 6 may be employed for maintaining the horizontality of said arms which may, after long use, have a tendency to sag.

The arms 5, in conjunction with the supporting casing 4, provide a spider-like framework, and said arms may consist of T-beams, upon the flange portions of which are supported the grid bars 8, any suitable number of which may be employed, and the spacing of these grid bars may be varied somewhat, dependent upon the nature of the plant growth that may be supported by means of the structure comprising the parts 4, 5, and 8 that for the purposes of this description may be hereinafter termed a grid unit.

It will be apparent that the screw 3 is adapted to be raised and lowered by means of bevel gears 9 and 10, the former carried by the screw and the latter carried by a horizontal shaft 11 having a suitable handle or other means 12 by which it may be rotated. The turning of the shaft 11 will revolve the screw 3 and by this means the grid unit may be raised or lowered, as required for purposes to be hereinafter set forth.

The grid unit above described is intended to be disposed in a tank 13, or lagoon structure, into which the sewage sludge will be fed from the supply conduits or other channels by which it is carried to the said tank. At the bottom of the tank or lagoon 13 will be located a filter bed 14, of sand or the like, upon which the grid unit above described is adapted to be lowered. When the grid is lowered upon the surface of the bed 14, the latter may be flooded with Imhoff tank sludge, for example, and the water of the sludge is allowed to drain away until the sludge becomes partly dry. Thereupon, straw, excelsior, brush, or similar material is placed upon the grid bars 8 of the grid unit and after further drying of the sludge the grid unit is elevated so that it will assume a position slightly above the level of the overflow 13' of the tank 13.

The straw, excelsior, brush, or like material previously referred to is intended to provide a root bed 15 for the plants, seedlings, or other plant life intended to be grown at the surface of the grid unit in the said root bed.

In the practice of the invention, when seeds or small plants, or the like, are planted in the root bed 15, the tank or lagoon 13 is maintained full of moisture-supplying sludge throughout the entire season of growth of the crop to be produced in the said tank structure. As the process of the invention is carried on, part of the water of the sludge drains down through the filter bed, or, if no filter bed is provided, is drained out at the bottom of the tank, and a considerable portion of said water will be sucked up from the sludge by the roots of the growing plants in the root bed 15.

As the plants in the root bed 15 continue to grow, it is desirable that the elevation of the grid unit, comprising primarily the bars 8, shall be adjusted. The purpose of this is to vary the distance between the level of the sludge or slurry in the tank 13 and the stem structures of the plants being grown, so that the root system of the plants may be supplied with the proper amount of air to promote the growth thereof during the period of sludge disposal.

Where a grain crop is planted and grown in the root bed 15, after the growing season is closed, the sludge is drained from the bed 14 and the grain is allowed to dry out by the natural deprivation of the moisture supply thereof derived from the sludge, before harvesting the crop. This will afford a saving of the cost of cutting, which always runs into substantial expense. When the crop is harvested, the grid bars 8 may be displaced and the roots and plants removed, together with the accumulated dry solids. After the removal of the accumulations on the grid bars, they may be replaced on the arms 5 and the operation of the process repeated by re-supplying the sludge from its source, rebuilding the root bed 15, and re-planting the growth which is to be grown over the grid unit and in the bed 15.

The process of growing the plant life as above described can be carried on either outdoors, or, if desired to be employed during the winter season, the lagoon or tank may be located in a greenhouse.

Of course, before repeating the process of the invention as above stated, it is desirable to clean off the surface of the sand bed 14.

As before premised herein, while I have described the adaptation of my invention to Imhoff tank sludge disposal, the process and apparatus set forth are equally adapted to be employed for any kind of organic sewage material.

From the foregoing it will be apparent that by the practice of the present invention, a substantial and important reduction in the cost of operation of sewage plants may be effected. Where ample dilution is available, except in the summer months, an installation involving screening, settling, and plant growing in the settled sludge, and located outdoors, will cheaply dispose of sewage and afford a relatively cheap structure for the purposes of the invention. Obviously, in installations employed at the present time where sand filters are availed of, the capacity of the installation may be materially increased by relatively small expenditure, by using the method and apparatus for plant growth dehydration, as above outlined. It is evident that the grid supporting unit for the root bed is of relatively simple structure and therefore susceptible of production at a small cost. In present installations where my method of plant growth dehydration is availed of, a considerable portion of the filter area may be released and can be used to take care of undigested solids, thereby giving rise to increased efficiency and capacity in present type disposal systems.

It is notable that it is contemplated within the purview of the invention that the relation of the root bed 15 to the surface level of the sludge or slurry in the tank 13 may be varied by changing the surface level while maintaining the position of the root bed fixed. Such effect may be produced by supplying the sludge flowing into the tank from the sewage lines or pipes to the tank through inflow openings located at different levels and adapted to be closed or opened by suitable gates.

It will also be understood that various mechanical devices may be employed as means for raising or lowering the grid unit of the invention, which carries the root bed, the mechanism employed being merely a preferred type because it is simple and enables a single jack to be availed of for effecting the movement of the grid supporting unit relatively to the surface level of the sludge in the container or tank 13.

Under some conditions, in lieu of the container or tank 13 which provides a disposal area for the dehydration treatment purposes of the invention, the sludge may be flowed onto a disposal area directly on the ground.

It will also be understood, of course, that in the operation of the process and apparatus of the invention, there will be a constant flowing into the disposal area of the tank 13 of the sewage, the latter supplied of course from a suitable pipe line or any sewage system.

Having thus described my invention, what I claim as new and desire to secure by Letters Patent of the United States, is:

1. The method of sewage disposal and utilization, which includes the steps of establishing a surface level of sewage on a disposal area, emplacing a root bed above the said surface level and sufficiently proximate thereto enable plants grown in the root bed to receive moisture from the sewage, growing plant life in the root bed to thereby dehydrate the sewage, and adjusting the relation of the sewage surface level and the root bed to ensure that the stem and root systems of the growing plants may receive the proper supply of air.

2. The method of sewage disposal and utilization, which includes the steps of establishing a surface level of sewage on a disposal area, emplacing a root bed above the said surface level and sufficiently proximate thereto to enable plants grown in the root bed to receive moisture from the sewage, growing plant life in the root bed to thereby dehydrate the sewage, and moving the root bed relatively to the sewage surface level to adjust said bed in relation to the sewage surface level to enable a proper amount of air to reach the root systems of plants grown in the root bed.

3. Apparatus for sewage disposal and utilization for productive purposes, comprising, in combination, a container having a sewage disposal area for containing tank sludge and establishing a surface level of such sludge therein, a grid supporting unit disposed above the surface level of the sludge of said disposal area, a root bed structure carried by said grid supporting unit, and means for causing relative adjustment of the positions of the sludge surface level and root bed to enable the root system of plant life growing in the root bed to receive the proper amount of air to promote growth.

4. Apparatus for sewage disposal and utilization for productive purposes, comprising, in combination, a container having a sewage disposal area for containing tank sludge and establishing a surface level of such sludge therein, a grid supporting unit disposed above the surface level of the sludge of said disposal area, a root bed structure carried by said grid supporting unit, and means for causing relative adjustment of the positions of the sludge surface level and root bed to enable the root system of plant life growing in the root bed to receive the proper amount of air to promote growth, said last means including instrumentalities for moving the grid supporting unit and thereby changing the position of the root bed carried thereon relatively to the surface level of the sludge.

5. Apparatus for sewage disposal and utilization for productive purposes, comprising, in combination, a container having a sewage disposal area for containing tank sludge and establishing a surface level of such sludge therein, a grid supporting unit disposed above the surface level of the sludge of said disposal area, a root bed structure carried by said grid supporting unit, and means for causing relative adjustment of the positions of the sludge surface level and root bed to enable the root system of plant life growing in the root bed to receive the proper amount of air to promote growth, said grid supporting unit comprising a frame and removable grid bars carried thereon in relatively close spaced relation for directly supporting said root bed.

6. Apparatus for sewage disposal and utilization for productive purposes, comprising, in combination, a container having a sewage disposal area for containing tank sludge and establishing a surface level of such sludge therein, a grid supporting unit disposed above the surface level of the sludge of said disposal area, a root bed structure carried by said grid supporting unit, means for causing relative adjustment of the positions of the sludge surface level and root bed to enable the root system of plant life growing in the root bed to receive the proper amount of air to promote growth, and jacking means cooperative with the grid supporting unit for raising and lowering the same whereby to adjust its position and that of the root bed carried thereon in relation to the surface level of the sludge in the disposal area.

7. Apparatus as claimed in claim 3, wherein the grid supporting unit comprises a base and standard thereon, screw means carried by the standard, a supporting member on said screw means, arms projecting from the screw means, grid bars on said arms, and an operating device for turning the screw means with jacking effect to thereby raise said arms and grid bars.

8. Apparatus for sewage disposal and utilization for productive purposes, comprising, in combination, a container for sludge, said container having means to maintain sludge at a predetermined surface level therein, a sand bed on the bottom of the container, a grid supporting unit adjacent to the surface of said sand bed, a root bed carried by the grid supporting unit, and means for adjusting the position of the grid supporting unit relatively to the surface level of the sludge in the container.

9. Apparatus as claimed in claim 8, wherein the grid supporting unit comprises a framework and removably mounted grid bars, the latter arranged to directly support the root bed thereon.

FREDERIC H. EMERY.